(12) United States Patent
Woo

(10) Patent No.: US 8,817,023 B2
(45) Date of Patent: Aug. 26, 2014

(54) METHOD, MEDIUM, AND SYSTEM RENDERING 3D GRAPHIC OBJECTS WITH SELECTIVE OBJECT EXTRACTION OR CULLING

(75) Inventor: Sang-oak Woo, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1099 days.

(21) Appl. No.: 11/889,187

(22) Filed: Aug. 9, 2007

(65) Prior Publication Data

US 2008/0079719 A1    Apr. 3, 2008

(30) Foreign Application Priority Data

Sep. 29, 2006    (KR) .................. 10-2006-0096397

(51) Int. Cl.
  *G06T 15/40*    (2011.01)

(52) U.S. Cl.
  USPC .................................................. 345/421

(58) Field of Classification Search
  None
  See application file for complete search history.

(56) References Cited

U.S. PATENT DOCUMENTS

| | | | |
|---|---|---|---|
| 6,054,989 A * | 4/2000 | Robertson et al. | 715/848 |
| 6,731,310 B2 * | 5/2004 | Craycroft et al. | 715/765 |
| 7,280,105 B2 * | 10/2007 | Cowperthwaite | 345/419 |
| 2002/0196251 A1 * | 12/2002 | Duluk et al. | 345/420 |
| 2003/0043147 A1 * | 3/2003 | Heim et al. | 345/421 |
| 2003/0210271 A1 * | 11/2003 | King | 345/771 |
| 2005/0060666 A1 * | 3/2005 | Hoshino et al. | 715/811 |
| 2005/0231506 A1 * | 10/2005 | Simpson et al. | 345/422 |
| 2006/0053389 A1 * | 3/2006 | Michelman | 715/775 |
| 2007/0103462 A1 * | 5/2007 | Miller | 345/421 |
| 2008/0225048 A1 * | 9/2008 | Bijankumar et al. | 345/421 |

OTHER PUBLICATIONS

Korean Non-Final Rejection dated Feb. 24, 2012 corresponds to Korean Patent Application No. 10-2006-0096397.

* cited by examiner

*Primary Examiner* — Daniel Hajnik
(74) *Attorney, Agent, or Firm* — Staas & Halsey LLP

(57) ABSTRACT

A method, medium, and system rendering 3-dimensional (3D) graphic objects. According to the 3D rendering method, medium, and system, a minimum number of objects for expressing a current state of a user interface are extracted, and the extracted objects are rendered, thereby enabling the rendering performance of a user interface engine to be improved. Here, according to a method, medium, and system minimizing the number of rendering objects, a minimum number of objects for expressing each state of a user interface are culled, and a list of the culled objects is generated, thereby enabling the minimum number of objects for expressing a current state of a user interface to be extracted using the list of the culled objects.

23 Claims, 17 Drawing Sheets

FIG. 6A
FIG. 6B
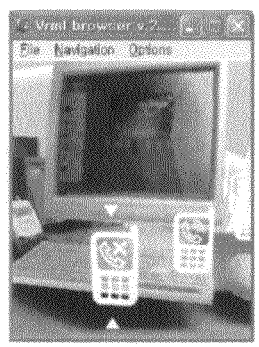
FIG. 6C
FIG. 6D
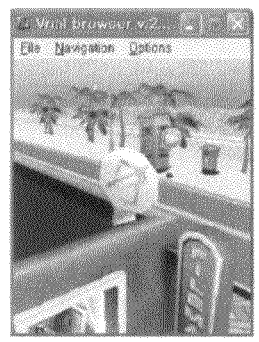
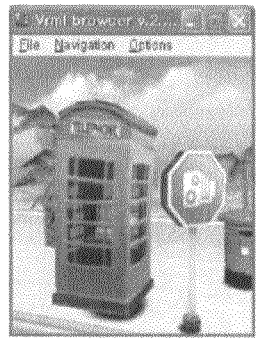

FIG. 12B
① OPAQUE
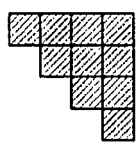
ID OF OBJECT : 4
DEPTH VALUE: 16
② TRANSPARENT
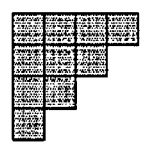
ID OF OBJECT: 5
DEPTH VALUE : 8
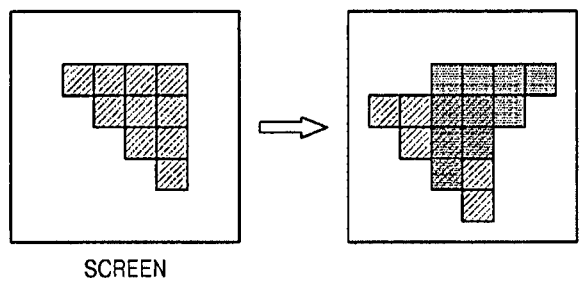
SCREEN
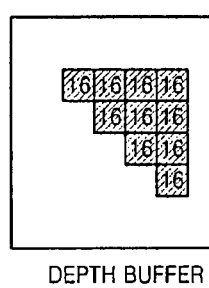
DEPTH BUFFER
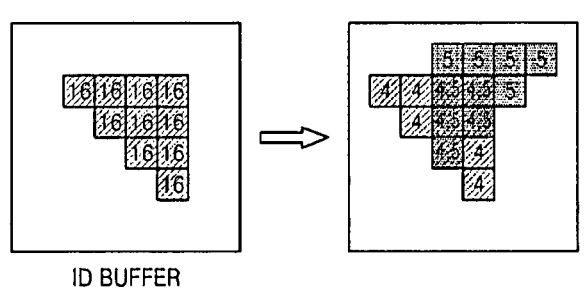
ID BUFFER

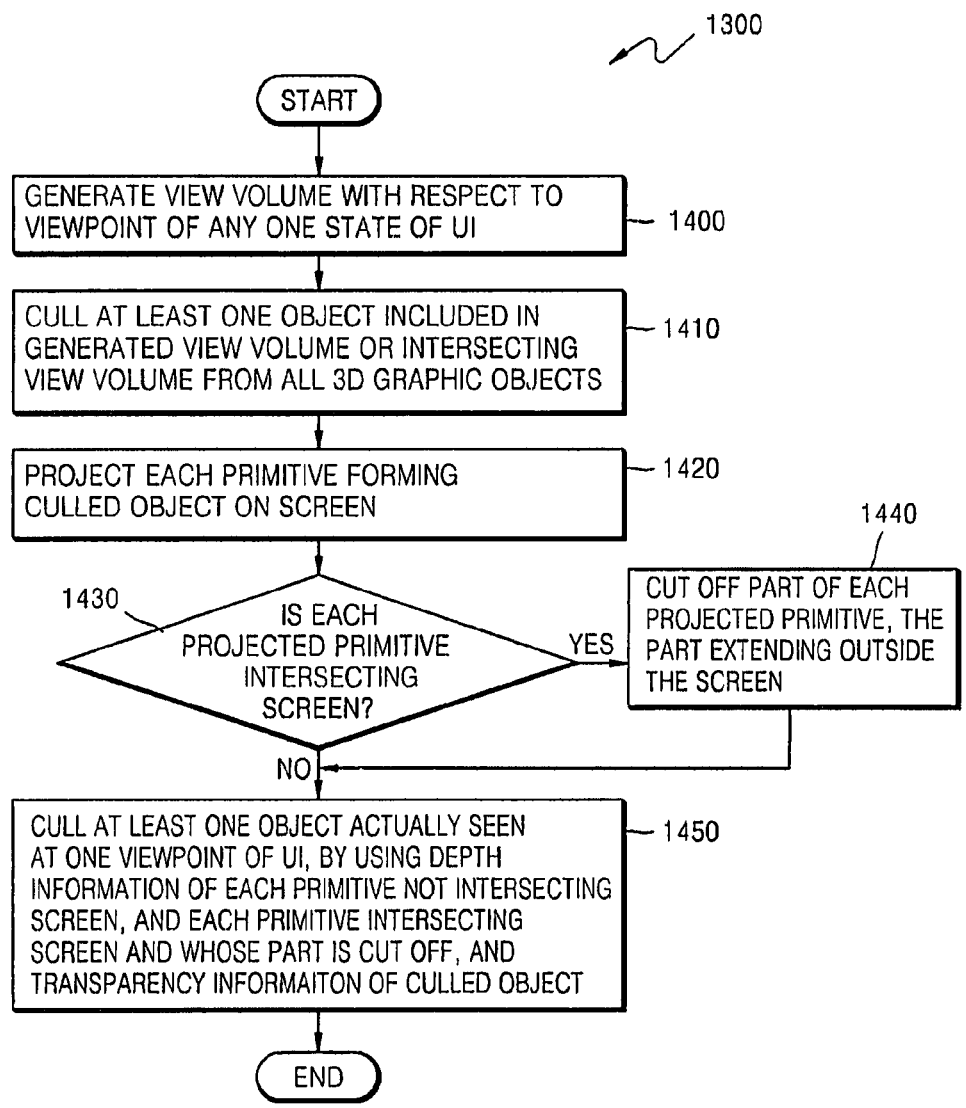

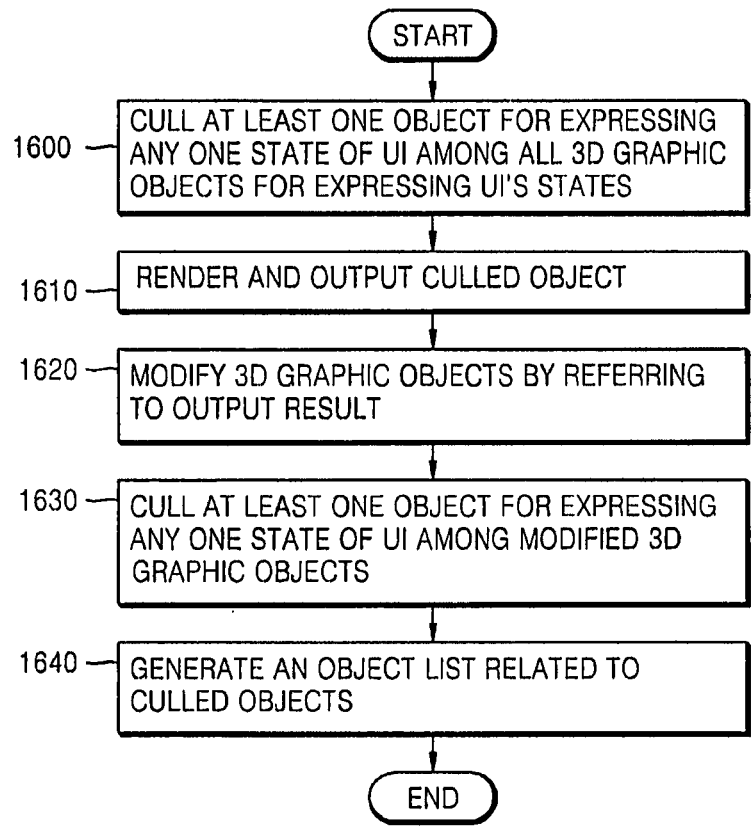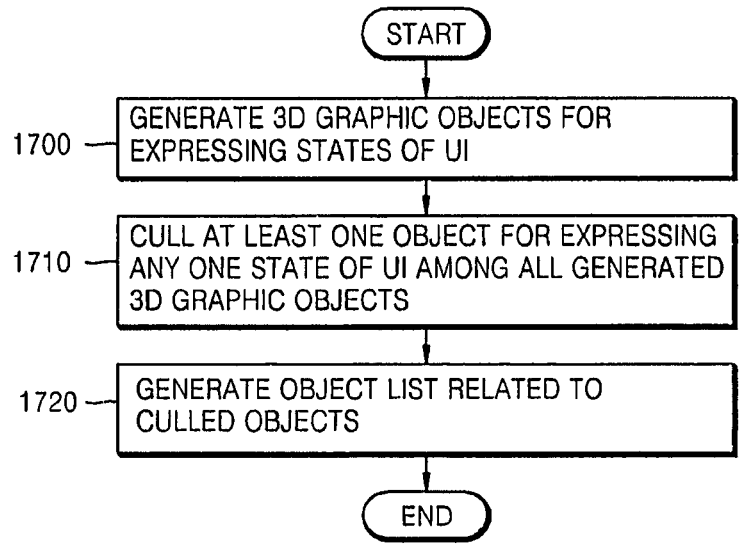

METHOD, MEDIUM, AND SYSTEM RENDERING 3D GRAPHIC OBJECTS WITH SELECTIVE OBJECT EXTRACTION OR CULLING

CROSS-REFERENCE TO RELATED APPLICATIONS

This application claims the benefit of Korean Patent Application No. 10-2006-0096397, filed on Sep. 29, 2006, in the Korean Intellectual Property Office, the disclosure of which is incorporated herein in its entirety by reference.

BACKGROUND OF THE INVENTION

1. Field of the Invention

One or more embodiments of the present invention relate to a method, medium, and system rendering 3-dimensional (3D) graphics, and more particularly, to a method, medium, and system rendering 3D graphic objects in consideration of the characteristic of a user interface. In addition, embodiments of the present invention further relate to a method, medium, and system minimizing the number of rendering objects, and more particularly, to a method, medium, and system minimizing the number of objects rendered in a rendering engine in consideration of the characteristic of a user interface.

2. Description of the Related Art

In a 3D graphic rendering engine for rendering 3D graphic data, the results of a visibility test of whether 3D graphic objects of 3D graphic data are actually displayed on a screen (that is, whether the objects are seen) is an important factor greatly influencing the performance of the 3D graphic rendering engine. Since the techniques for testing this visibility vary greatly, it is desirable to select a visibility test suitable for the characteristic of the system to which the corresponding rendering engine is applied. For example, in the case of 3D computer-aided design (CAD) for generating a drawing of a product, internal information of the inside of the product as well as external information of the outside of the product is important, and a visibility test technique that is suitable for such an application would be desired. However, unlike CAD, where the internal information is important, in the case of a 3D graphic game, in order to generate dynamic scenes according to the free movement of a viewpoint, 3D graphic scenes should be output in synchronization with the moving speed of the viewpoint. In order to do this, 3D graphic scenes should typically be rendered quickly according to the speed of the moving viewpoint. In addition, in order to interact with a user, it may be important to render graphics in real time, so an appropriate visibility test suitable for such characteristics of the 3D graphic game is desirable.

Thus, in the case of a user interface providing a 3D menu, a visibility test that is suitable for the user interface is desirable. In such a user interface, the state of the user interface is transited along a predetermined path according to an input signal of the user, and the scope of the states that can be transited is also restricted. Further, since a viewpoint is fixed to each state of the user interface, due to the characteristic of the user interface, objects actually displayed on the screen (that is, objects that are actually seen on the screen) do not change, and objects seen on the screen in each state can be predicted in advance. However, conventional visibility test techniques do not consider this characteristic of the user interface.

SUMMARY OF THE INVENTION

One or more embodiments of the present invention provide a method, medium, and system rendering 3-dimensional (3D) graphics capable of improving a rendering performance by considering the characteristic of a user interface, in which a minimum number of objects for expressing a current state of the user interface are extracted from 3D graphic objects, and only the extracted objects are rendered. One or more embodiments of the present invention also provide a method, medium, and system minimizing the number of rendering objects, in which a minimum number of objects for expressing each state of a user interface are culled, and an object list of the culled objects is generated, thereby enabling only the minimum number of objects to be rendered by using the object list generated in a rendering engine.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of rendering 3-dimensional (3D) graphic objects, including extracting at least one object, from a plurality of 3D graphic objects, corresponding to a current state of a user interface, from a plurality of viewpoint based states of the user interface, and selectively rendering the extracted at least one object.

To achieve the above and/or other aspects and advantages, embodiments of the present invention include a system rendering 3D graphic objects, including an object extraction unit to extract at least one object, from a plurality of 3D graphic objects, corresponding to a current state of a user interface, from a plurality of viewpoint based states of the user interface, and a rendering unit to selectively render extracted objects.

To achieve the above and/or other aspects and advantages, embodiments of the present invention include a method of minimizing a number of rendering objects for rending 3D graphic objects, including culling at least one object, from a plurality of 3D graphic objects corresponding to a plurality of viewpoint based states of a user interface, corresponding to any one state of the user interface, from the plurality of states of the user interface, and generating an object list with respect to the at least one culled object with reference to the one state of the user interface.

To achieve the above and/or other aspects and advantages, embodiments of the present invention include a method of minimizing a number of rendering objects for rending 3D graphic objects, including culling at least one object, from a plurality of 3D graphic objects corresponding to a plurality of viewpoint based states of a user interface, corresponding to any one state of the user interface, from the plurality of states of the user interface, generating an object list with respect to the at least one culled object with reference to the one state of the user interface, extracting the at least one object from the object list, corresponding to a current state of the user interface, and selectively rendering the extracted at least one object.

To achieve the above and/or other aspects and advantages, embodiments of the present invention include a system minimizing a number of rendering objects, including an object culling unit to cull at least one object, from a plurality of 3D graphic objects corresponding to a plurality of viewpoint based states of a user interface, corresponding to any one state of the user interface, from the plurality of states of the user interface, and an object list generation unit to generate an object list with respect to the at least one culled object with reference to the one state of the user interface.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A through 6D illustrate examples of a user interface to which an embodiment of the present invention can be applied;

FIGS. 12A and 12B are reference diagrams explaining an update unit, according to an embodiment of the present invention;

FIG. 14 is a detailed flowchart of a culling operation, such as operation 1300 of FIG. 13, in which a minimizing system culls at least one object for expressing any one state of a user interface from all 3D graphic objects for expressing the states of the user interface, according to an embodiment of the present invention;

FIG. 16 illustrates a method of minimizing the number of rendering objects, according to an embodiment of the present invention;

FIG. 17 illustrates a method of minimizing the number of rendering objects, according to another embodiment of the present invention.

DETAILED DESCRIPTION OF THE PREFERRED EMBODIMENTS

Figure 1:
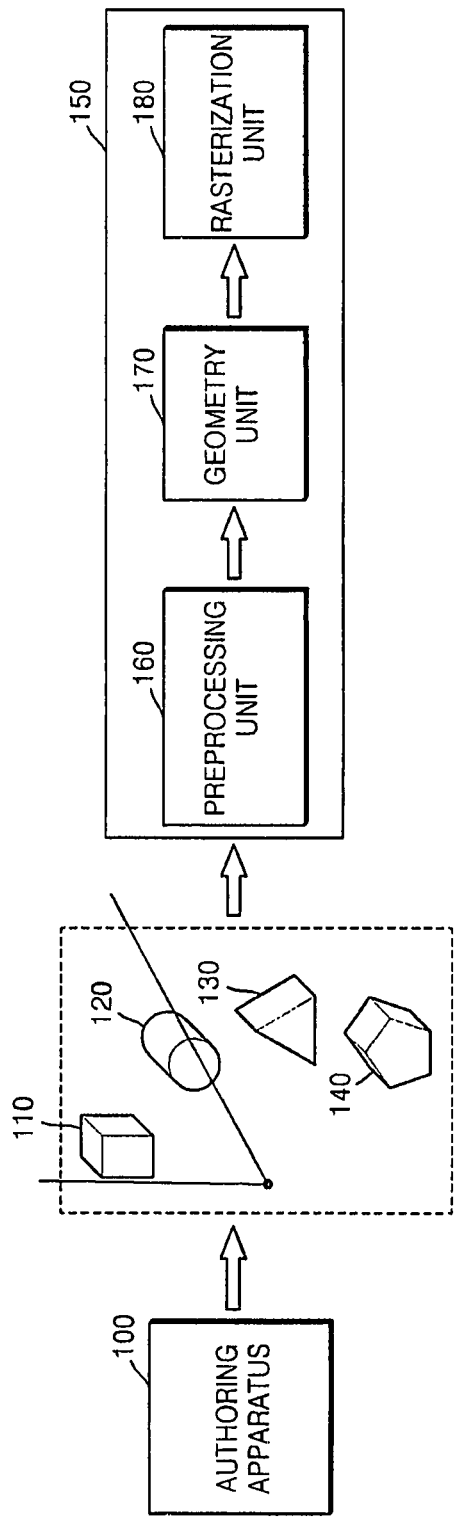
FIG. 1 is a reference diagram explaining a conventional relationship between a 3-dimensional (3D) graphic object authoring device and a 3D graphic rendering engine.

Reference will now be made in detail to embodiments of the present invention, examples of which are illustrated in the accompanying drawings, wherein like reference numerals refer to the like elements throughout. Embodiments are described below to explain the present invention by referring to the figures.

First, referring to FIG. 1, a desirability and importance of a visibility test will now be explained. FIG. 1 is a reference diagram explaining a general conventional relationship between a 3-dimensional (3D) graphic object authoring device and a 3D graphic rendering engine, showing an authoring apparatus 100, a rendering engine 150, and 3D graphic objects 110 through 140.

The authoring apparatus 100 is an apparatus generating a 3D graphic object, and can be implemented as a computer capable of executing a graphic application program, for example.

Authoring programs capable of generating 3D graphic objects include 3D Studio Max, Soft Image 3D, and MAYA, for example.

The 3D graphic objects 110 through 140, which are objects that may be generated in the authoring apparatus 100, can be input to the rendering engine 150, and rendered.

The rendering engine 150 renders the input 3D graphic objects 110 through 140, and generally includes a preprocessing unit 160, a geometry unit 170, and a rasterization unit 180, for example.

When these units are seen in terms of respective operations, a rendering process of a 3D graphic object includes a preprocessing operation, a geometry operation, and a rasterization operation. In the preprocessing operation, a rendering object is expressed in primitives as basic elements of rendering, and the primitives are transferred to the geometry operation. A primitive may basically include a vertex, a line, and a polygon, including a triangle, for example.

The geometry operation can also be referred to as a transformation and lighting (T&L) operation. In this operation, coordinates for expressing each primitive forming a 3D object on a screen are calculated. In addition, here, hidden faces or vertices are removed, and a triangle cut off at a corner of the screen is reconstructed. When a light source is used, the light source effect with respect to a surface normal of each face is also calculated, thereby calculating the color of each vertex.

The rasterization operation requires the largest amount of computation in the rendering process.

In the rasterization operation, the color of each pixel on the screen, on which graphics are actually displayed, is calculated by using the colors of vertices of each triangle, coordinates on the screen, and texture coordinates, and stored in a pixel buffer. In the rasterization operation, a realistic effect may also be added to the graphics.

In this conventional discussion, the detailed operations described above correspond to respective detailed elements of the rendering engine 150.

Thus, since the rendering process is performed by carrying out a large number of operations, the amount of computation increases with the increase in the number of rendering objects. Accordingly, the larger the number of rendering objects becomes, the lower the performance of the rendering engine 150.

In particular, even when all objects that are not displayed on a screen are rendered, the amount of unnecessary computation increases excessively, thereby further lowering the rendering performance.

Accordingly, conventionally, before rendering is performed, the objects 130 and 140 that are not actually seen on the screen, from among the 3D graphic objects 110 through 140, are removed from the rendering, and only the objects 110 and 120 that are actually seen on the screen are provided for rendering. Improving the performance of the rendering engine 150 in this way is one of the technical objectives of embodiments of the present invention. In particular, inventors of the present invention believe a visibility test can be used suitable for the characteristic of a 3D user interface, thereby improving the performance of a rendering engine.

Conventional visibility test techniques have been suggested in order to cull invisible objects from 3D graphic objects. In order to understand a visibility test according to an embodiment of the present invention, some conventional visibility test methods will now be explained.

Figure 2:
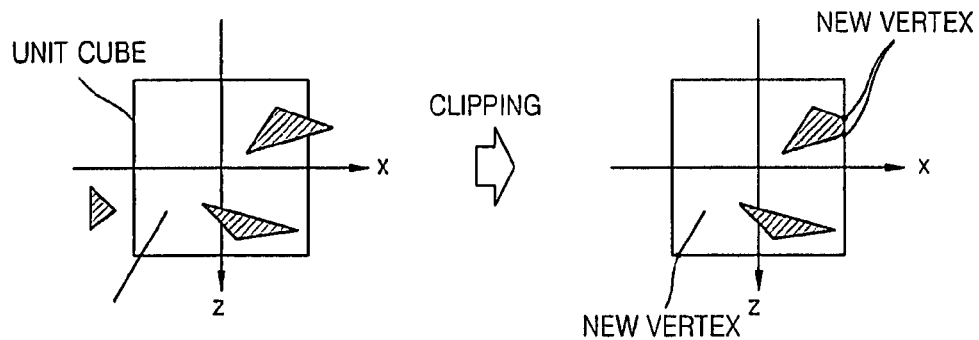
FIG. 2 is a reference diagram explaining a conventional clipping visibility test.

First, FIG. 2 demonstrates a clipping visibility test, as one of the basic techniques. Thus, FIG. 2 is a reference diagram explaining this conventional clipping visibility test. As illustrated in FIG. 2, the clipping is performed so that only all or some primitives that are included in a view volume can be forwarded to a rasterization operation. The view volume is a 3D space that can be seen on the screen.

However, in order to obtain the part at which the boundary of the view volume intersects with the boundary of each primitive, the preprocessing and geometry operations for each primitive should be performed. Accordingly, the preprocessing and geometry processes for all primitives is performed, such that if the number of primitives positioned outside the view volume is large, the performance of a rendering engine cannot be improved only by clipping.

Figure 3A:
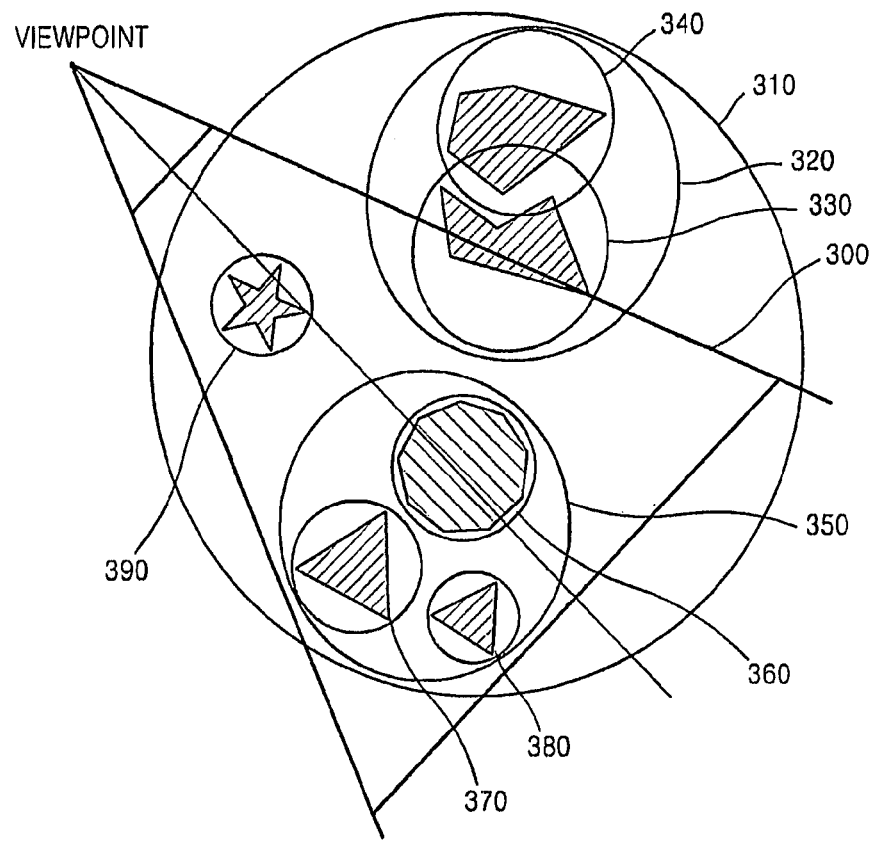
FIGS. 3A and 3B are reference diagrams explaining a conventional hierarchical viewing frustum culling visibility test.
Figure 3B:
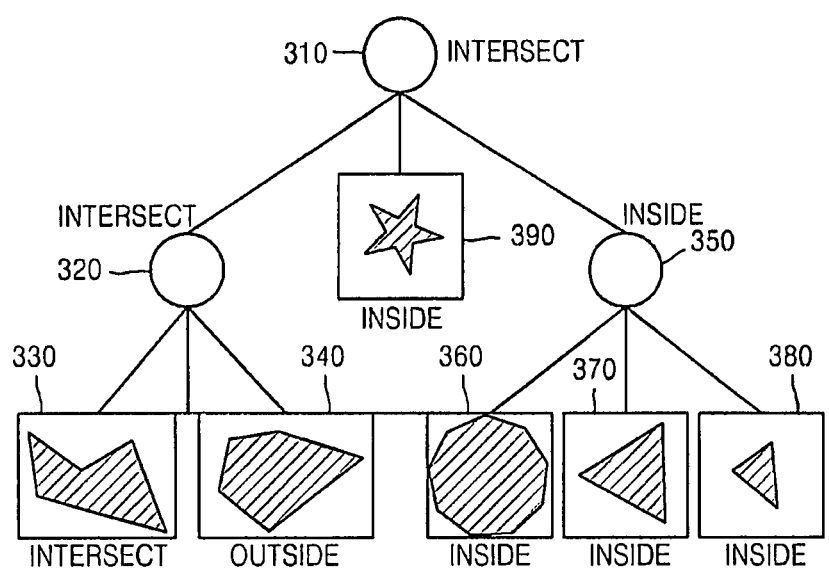

Another technique is viewing frustum culling in which it is determined whether to render a primitive based on whether the bounding volume of the primitive intersects with a viewing frustum. FIGS. 3A and 3B are reference diagrams explaining such a conventional hierarchical viewing frustum culling visibility test.

In the hierarchical viewing frustum culling technique, as illustrated in FIGS. 3A and 3B, each primitive is constructed hierarchically and the boundary of the primitive is set hierarchically. Then, by determining whether the hierarchical boundary volumes intersect with the viewing frustum, the visibility of each primitive can be efficiently determined. FIG. 3A illustrates the boundary volumes of primitives which are hierarchically constructed and intersect with the viewing frustum. FIG. 3B is a relationship diagram in which primitives are hierarchically constructed in a tree structure.

This hierarchical viewing frustum culling technique can improve rendering performance in a scene in which many primitives are distributed over a wide area. However, here, there is still the problem that a primitive that is covered by another primitive, positioned so as to appear closer to the viewpoint and is not actually meant to be seen on the screen, cannot be removed.

Figure 4:
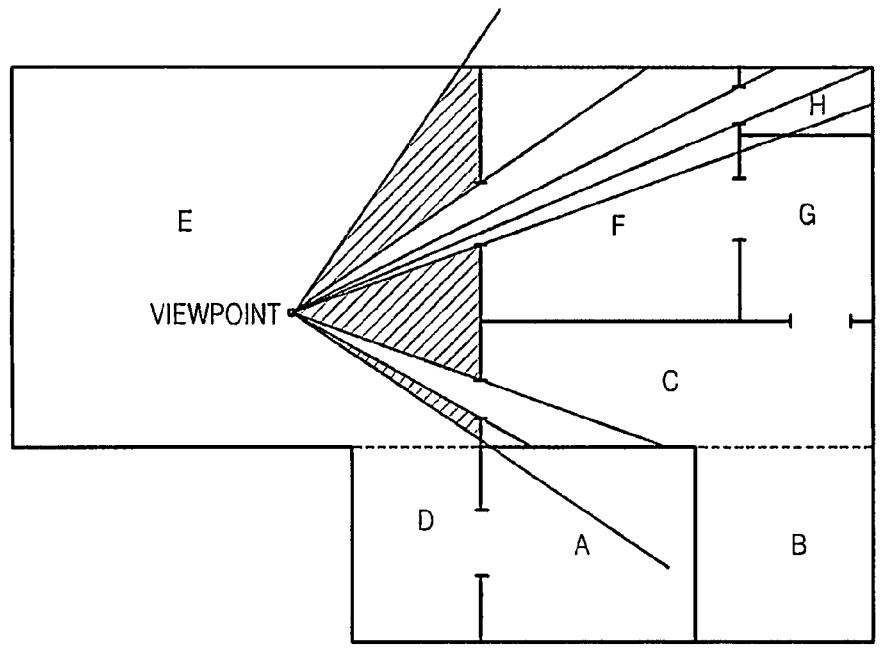
FIG. 4 is a reference diagram explaining a conventional portal culling visibility test.

Another technique is a conventional portal culling technique that is widely used in 3D games utilizing indoor scenes. Thus, FIG. 4 is a reference diagram explaining this conventional portal culling visibility test. As illustrated in FIG. 4, walls play a role of a large mask for an indoor scene. Accordingly, in the portal culling technique, invisible primitives are culled by utilizing a portal, such as a door or a window. This technique is useful when an indoor scene is rendered. However, when the scene is not an indoor scene, this method does not help much in terms of the rendering performance.

Figure 5:
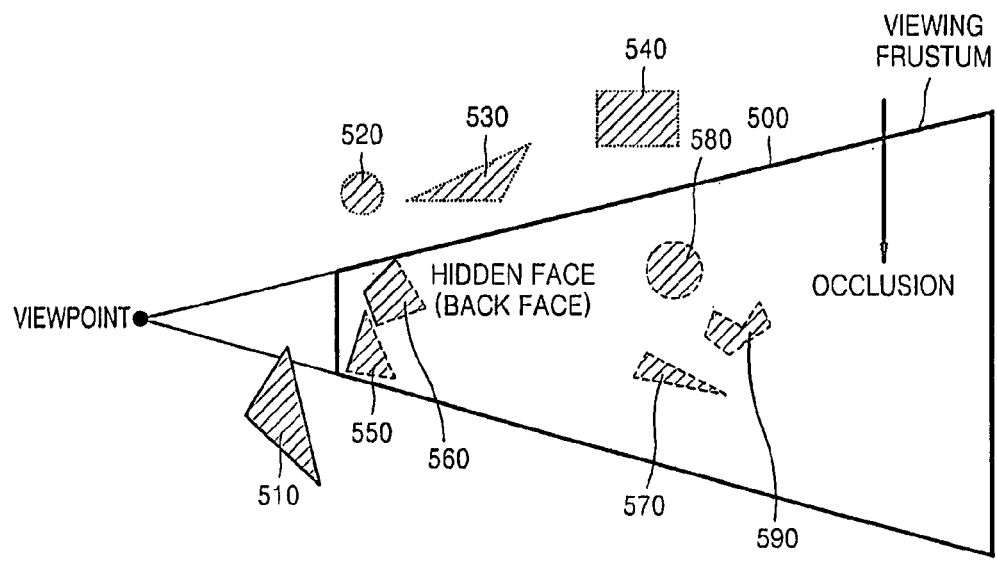
FIG. 5 is a reference diagram explaining a conventional occlusion culling visibility test.

Another technique is an occlusion culling technique. Here, FIG. 5 is a reference diagram explaining this conventional occlusion culling visibility test. As illustrated in FIG. 5, in this technique, a primitive that is in a view volume but covered with another primitive is culled. A leading example of this is the hierarchical Z buffering technique. According to this occlusion culling technique, the rendering performance can be improved when a large scene is rendered. However, since this technique is also performed in the rendering process and requires a large amount of computation, a large capacity buffer is required, which is a drawback.

Finally, there is a potentially visible set technique. The potentially visible set technique is for rendering only, for example, an object that can be seen at a given viewpoint. However, since only a list of objects that can be seen may be provided in this technique, the potential visible set includes many objects that can be seen but are not actually seen at a given viewpoint. Accordingly, this technique cannot render only objects that are actually seen.

In general, in a user interface, such as a menu of a mobile device, the number of states that can be transited is finite and states are transited through a preset path according to a user's input signal. For example, when a mobile phone menu is provided through a 3D graphic user interface (GUI), the mobile phone menu may have states, such as a wait state, an initial menu state, and a call state. The number of states that the mobile phone menu has is typically very limited, and the path of the states transited according to the user's input signal can be predicted. For example, if the user presses a call button, the menu moves to a state where a calling number list is output, or if the user presses an upward arrow button, the previous menu is returned to.

Since the viewpoint in a 3D graphic space is typically fixed in each state so that the viewpoint does not move, if the state of the mobile phone menu is transited, the objects in the 3D graphic space can typically be seen from only one viewpoint corresponding to the transited state. Accordingly, if a current state of the mobile phone menu is determined, there may be only one viewpoint corresponding to the state, and the 3D graphic objects that are actually seen on the screen when in the state may not change.

Figure 7:
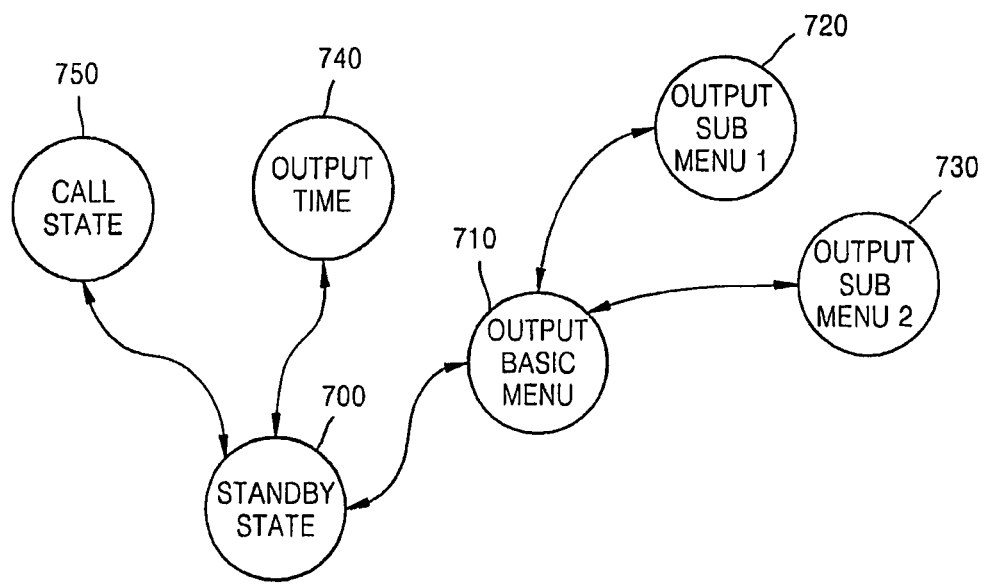
FIG. 7 illustrates an example state transition table of a state transition among states of a user interface to which an embodiment of the present invention can be applied.

Specific examples of this will now be explained with reference to FIGS. 6A through 6D, and FIG. 7. FIGS. 6A through 6D illustrate an example of a user interface to which an embodiment of the present invention can be applied. FIG. 7 illustrates a state transition table of a state transition among states of a user interface to which an embodiment of the present invention can be applied.

FIGS. 6A through 6D illustrate 3D graphic objects, respectively, displayed on the screen of a mobile phone providing a 3D menu. Whenever the user presses a button of the mobile phone, the state of the mobile phone menu is transited, and according to the transited state, any one of the scenes illustrated in FIGS. 6A through 6D can be displayed on the screen. As in the mobile phone menu, a viewpoint can be fixed in a 3D graphic scene in a user interface so that the viewpoint does not move in one state. Then, since each state of the user interface corresponds to only one viewpoint, objects that are actually intended to be seen on the screen can be determined according to the state of the user interface. That is, by making each state of the user interface have only one viewpoint, the objects that are seen on the screen can be made to be determined not by a viewpoint, but by the state of the user interface. In this way, since a viewpoint in the 3D user interface is fixed according to the state, it has been found that the 3D user interface has characteristics that objects that are seen on the screen can be culled according to the state, and according to the user's input signal, the state of the user interface is transited along a predetermined path.

Accordingly, in an embodiment of the present invention, by considering these characteristics of the 3D user interface, objects that are seen, according to each state of a 3D user interface, can be extracted and the list of the objects can be stored prior to a rendering operation. Thus, by referring to the list of objects, the user interface can render objects required according to a current state of the user interface, i.e., the objects that are seen from the viewpoint of the current state, thereby improving the rendering performance of the user interface.

Figure 8:
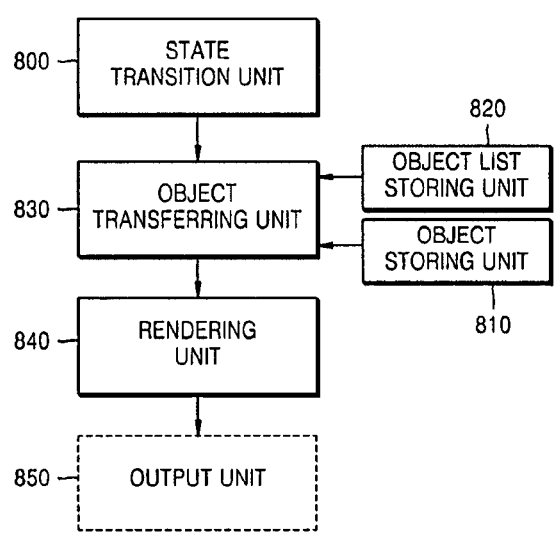
FIG. 8 illustrates a system rendering 3D graphics, according to an embodiment of the present invention.

A method, medium, and system rendering 3D graphics, according to an embodiment of the present invention, will now be explained with reference to FIGS. 8 and 9. FIG. 8 illustrates a system rendering 3D graphics, according to an embodiment of the present invention, and may include a state transition unit 800, an object storing unit 810, an object list storing unit 820, an object transferring unit 830, a rendering unit 840, and an output unit 850, for example.

The state transition unit 800 may determine a current state of a user interface, e.g., according to an input of a state transition signal for transiting the current state of the user interface, and forward an indication of the transited result to the object transferring unit 830, for example.

The state transition table is a table including a next state to which a current state of the user interface transits, e.g., according to an input of each state transition signal of the user interface. The state transition table may store information on a next state, to which a current state of the user interface transits according to the current state of the user interface and an input state transition signal, for example. Generally, the next transited state is determined according to the current state and the input state transition signal. However, in an embodiment, e.g., when necessary, a next state to which the current state is to be transited may also be determined only by an input state transition signal, irrespective of the current state.

In an embodiment, the state transition signal may be an input signal input by a user, e.g., input by using an input unit disposed at the user interface. The input unit may include a keyboard of a personal computer (PC), a mouse, a keyboard of a personal digital assistant (PDA), a joystick, and a keyboard of a mobile phone, noting that alternative embodiments are equally available.

In an embodiment, the object storing unit 810 may store all 3D graphic objects for expressing the states of the user interface. Thus, according to one embodiment of the present invention, the hierarchical viewing frustum culling technique described above with reference to FIGS. 3A and 3B, may be used by hierarchically describing the 3D graphic objects. As illustrated in FIG. 3B, 3D graphic objects can be constructed in a tree structure according to hierarchical information, with this tree structure being referred to as a scene graph. Thus, in this example, the object storing unit 810 may store 3D graphic objects according to the hierarchical information of this scene graph. This scene graph information is information that can be used when a visibility test, according to a viewing frustum culling technique, is performed with respect to the objects stored in the object storing unit 810.

The object list storing unit 820 may store an object list corresponding to each state of the user interface, for example. The object list corresponding to each state of the user interface may be a list of objects that should actually be seen on the screen from the viewpoint for each state. In this case, the screen may be a display that displays 3D graphic objects for expressing each state of the user interface in order to provide the user interface. The object lists stored in the object list storing unit 820 can be prepared, for example, by previously extracting at least one object for expressing each state of the user interface from among 3D graphic objects stored in the object storing unit 810, e.g., before rendering 3D graphic objects, and storing an object list of the extracted objects together with information on each state.

The object transferring unit 830 may receive the current transited state of the user interface transferred from the state transition unit 800, select an object list corresponding to the current state of the user interface from the object lists stored in the object list storing unit 820, and read the selected object list. Then, the object transferring unit 830 may extract at least one object included in the object list, e.g., from among the 3D graphic objects stored in the object storing unit 810, and transfer the object to the rendering unit 840. Here, the at least one object for expressing the current transited state of the user interface may be an object that is meant to actually be seen on the screen from the viewpoint of the current state.

The rendering unit 840 may further render the at least one extracted object and provide the rendered result to the output unit 850. Since the at least one object that is meant to actually be seen on the screen from the viewpoint of the current state of the user interface is extracted, and as the rendering unit 840 may render only the extracted objects, the rendering unit 840 may not need to render the remaining objects that are not extracted. Furthermore, in such an embodiment, a visibility test for testing whether an object should actually be seen on the screen can be performed with respect to 3D graphic objects before rendering, and a list of objects that should actually be seen can be generated and stored in advance. Accordingly, the rendering unit 840 does not need to directly perform a visibility test on the 3D graphic objects. That is, in such a case, since the rendering unit 840 does not perform a visibility test and does not perform rendering of objects that are not actually seen, the amount of computation required for rendering can be greatly reduced over conventional systems, thereby improving the rendering performance.

Here, the output unit 850 may output the rendered result onto a screen, for example. However, in an embodiment, the system for rendering 3D graphic objects may not include the output unit 850, and therefore the output unit 850 has been indicated by dotted lines in FIG. 8.

Figure 9:
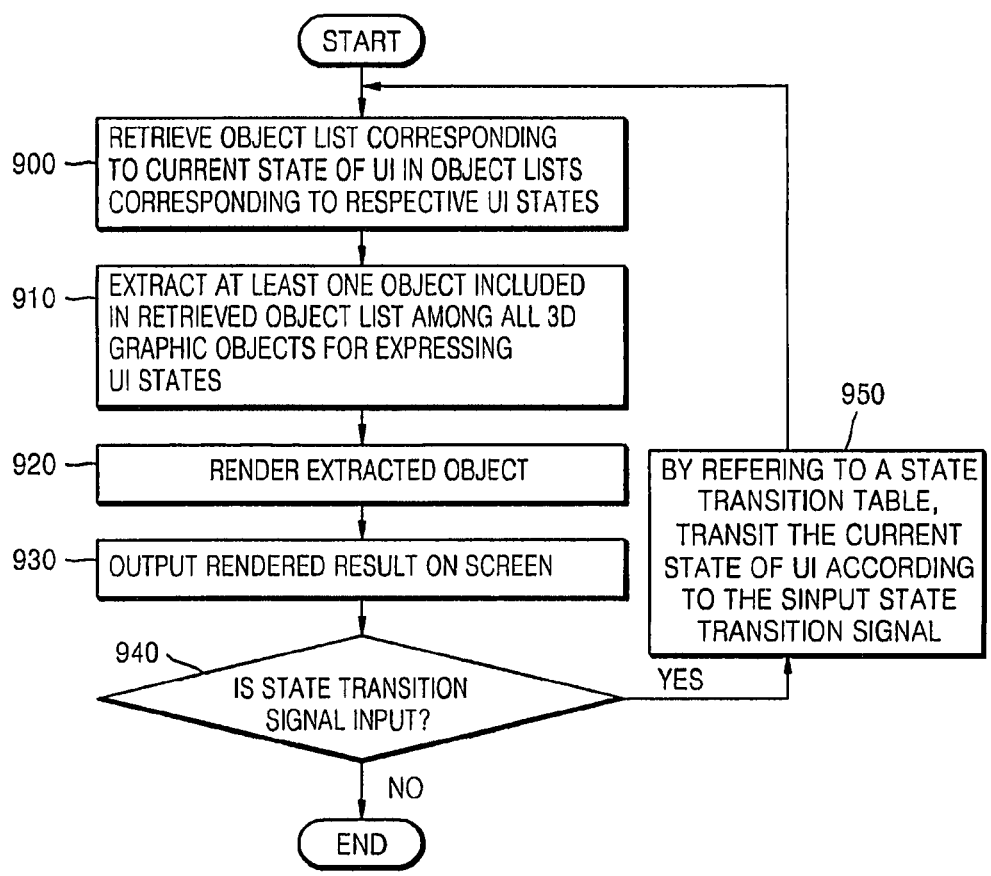
FIG. 9 illustrates a method of rendering 3D graphics, according to an embodiment of the present invention.

FIG. 9 illustrates a method of rendering 3D graphics, according to an embodiment of the present invention. Here, the method of rendering 3D graphics may be performed by such a rendering system as that shown in FIG. 8, for example, noting that alternatives are also available.

In operation 900, an object list corresponding to the current state of a user interface may be retrieved from among object lists corresponding to respective states of the user interface. As noted above, the object list corresponding to the current state of the user interface can be a list of at least one object for expressing a current state among 3D graphic objects for expressing the states of the user interface, and may be a list of at least one object that is actually seen on the screen from the viewpoint of the current state.

In operation 910, at least one object included in the retrieved object list may be extracted from among 3D graphic objects for expressing the states of the user interface. The 3D graphic objects may be stored in a storage medium, for example, inside the user interface, or may be stored in a storage medium disposed in another system connected through a communication network, again noting that alternatives are also available.

In operation 920, the extracted object may be rendered.

Since the object extracted in operation 910 is an object that is meant to actually be seen on the screen from the viewpoint of the current state of the user interface and is culled in advance of the rendering operation, a separate visibility test may not be needed on the extracted object in operation 920. Thus, in operation 920, the a rendering process on objects that are not actually seen on the screen can be omitted, and a visibility test process for culling objects that are actually seen on the screen from the 3D graphic objects can be omitted, resulting in the efficiency of the rendering system being improved over conventional systems. In addition, since rendering processes are still performed on the objects that are meant to actually be seen on the screen can be identical to those of conventional systems for similar to objects meant to be seen (compared to those objects not meant to be seen), the quality of the rendered pictures is not lowered compared to such conventional systems.

In operation 930, the rendered result may be output.

In operation 940, it may be determined whether not a state transition signal is input. If the state transition signal is input, operation 950 may be performed, or the 3D graphic rendering according to the current embodiment may be completed. In an embodiment, the state transition signal may be input by a user, using an input unit of the user interface, for example, and the input unit can be a variety of types, including a button, a keyboard, a mouse, a joystick, and a touch screen, again noting that alternatives are equally available.

In operation 950, by referring to a state transition table, the current state of the user interface may be transited according to the input state transition signal. As a similar state transition table has been described above with reference to the state transition unit 800 illustrated in FIG. 8, a further detailed explanation thereof will be omitted here.

As described above, the method, medium, and system rendering 3D graphics, according to an embodiment of the present invention, may extract only at least one object that is actually meant to be seen on the screen from the viewpoint of the current state of the user interface, and renders that at least one object. An object that is actually seen on the screen from the viewpoint of the current state can be said to be from a list of 3D graphic objects that is a minimum requirement for expressing the current state of the user interface. This is because the objects that are actually seen may be considered essential for expressing the current state, and if any one of these is omitted, one of the objects that should be actually seen on the screen would not be seen. Accordingly, in such a method, medium, and system rendering 3D graphics, a visibility test is performed on 3D graphic objects in consideration of the characteristic of the user interface, and the result is stored before the rendering of the graphic objects. Then, when the rendering is performed, only a minimum number of objects that are needed for expressing the current state of the user interface are extracted by using the result of the previously performed visibility test, and rendered, thereby improving the rendering performance over conventional systems.

According to a method, medium, and system minimizing the number of rendering objects, according to an embodiment of the present invention, in order to enable the rendering of only a minimum number of objects for expressing the current state of the user interface, at least one object for expressing each state of the user interface is culled prior to the rendering of the objects, from all 3D graphic objects for expressing the states of the user interface, and an object list of the culled objects is generated and stored.

Figure 10:
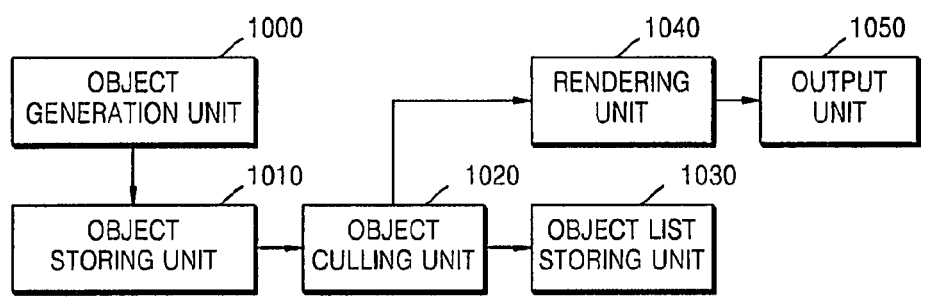
FIG. 10 illustrates a system storing 3D graphics, according to an embodiment of the present invention.

FIG. 10 illustrates a system storing 3D graphics, according to an embodiment of the present invention. The system may include an object generation unit 1000, an object storing unit 1010, an object culling unit 1020, an object list storing unit 1030, a rendering unit 1040, and an output unit 1050. In another embodiment of the present invention only the object culling unit 1020 and the object list storing unit 1030 are included in the system, for example.

The object generation unit 1000 may generate 3D graphic objects for expressing the states of the user interface, for example. Generally, a 3D graphic object can be generated or modified by using a graphic application program, such as 3D Studio Max, Soft Image 3D, and MAYA, for example. The user may, thus, generate a 3D graphic object, or modify an already generated graphic object for re-editing, by using such authoring programs. In addition, the user can execute the authoring program, by using an input unit, such as a keyboard or a mouse, to thereby generate or modify a 3D graphic object.

The object storing unit 1010 may store a 3D graphic object, e.g., as generated or modified in the object generation unit 1000. Here, the object storing unit 1010 may thus store previously generated 3D graphic objects. The object storing unit 1010 may classify objects according to a hierarchical structure and store the classified objects. For example, as described above with reference to FIGS. 3A and 3B, 3D graphic objects may be constructed hierarchically according to a spatial structure in a 3D graphic space. In a bottom layer, bounding volumes 330, 340, 360, 370, 380, and 390 surrounding respective objects are generated. Then, in the next layer, bounding volumes of intermediate layers accommodating a plurality of bounding volumes at a lower layer may be generated. In FIG. 3B, it can be seen that an intermediate layer 320 including upper objects 330 and 340 and an intermediate layer 350 including lower objects 360 through 380 may be generated. Then, at a next higher layer than the intermediate layers, an upper layer including an intermediate layer or a lower layer may be generated. FIG. 3B illustrates the generation of an upper layer 310 including the two intermediate layers 320 and 350 and one lower layer 390. If the objects are classified, thus, in a bounding volume hierarchy, when objects stored in the object storing unit 1010 are culled in a first culling unit 1100, which will be explained later, according to a hierarchical viewing frustum culling method, the objects can be culled very efficiently.

The object culling unit 1020 may cull at least one object for expressing one state of the user interface from the 3D graphic objects stored in the object storing unit 1010, and generate an object list with respect to the culled object. Here, the at least one object for expressing any one state of the user interface may be an object that is meant to actually be seen from the viewpoint of the corresponding state.

The object list storing unit 1030 may further store the object list, with respect to the culled object generated in the object culling unit 1020, for example. In this case, the object list storing unit 1030 may store a corresponding relation between any one state of the user interface and the object list corresponding to the state. In this way, when necessary, an object list corresponding to a current state of the user interface can be retrieved later from a plurality of object lists corresponding to respective states of the user interface.

The rendering unit 1040 may render the at least one object, e.g., culled in the object culling unit 1020, and transfer the rendered result to the output unit 1050, for example. The output unit 1050 may further output the transferred rendered result to the display for display onto the screen. The user may confirm the 3D graphic object output on the screen and, when necessary, may further modify the object using the object generation unit 1000. For example, when a 3D graphic object that is to be used as a menu of a mobile phone is generated, it may be desired that the mobile phone be operated with low power, with the hardware specifications correspondingly limited, and therefore, it may be desired to limit the number of rendering objects to be output onto one screen. At this time, in such an embodiment, in a process of authoring rendering objects, the user may cull objects that are seen on the screen according to the state of the mobile phone menu, render the culled objects, output the rendered objects on the actual screen, and then, modify objects by viewing the objects that are to be actually output onto the screen, so that some objects among the objects output onto the screen will not be displayed on the screen. Accordingly, the user can confirm a screen output from the output unit 1050, modify the position or size of a 3D graphic object in the object generation unit 1000, and store the modified objects in the object storing unit 1010. Then, the object culling unit 1020 may cull objects required according to the state of a system from among the modified objects, and transfer the list of the culled objects to the object list storing unit 1030. In an embodiment, the object list storing unit 1030 stores the transferred object list together with the state information.

Here, according to an embodiment, since such a system may include the rendering unit 1040, the output unit 1050, and the object generation unit 1000, the user can confirm the rendering object that is actually seen on the screen, and modify the object. However, in another embodiment, the rendering unit 1040 and the output unit 1050 may not be needed. Similarly, the object generation unit 1000 and the object storing unit 1010 may also not be needed, noting that alternative embodiments are equally available.

Figure 11:
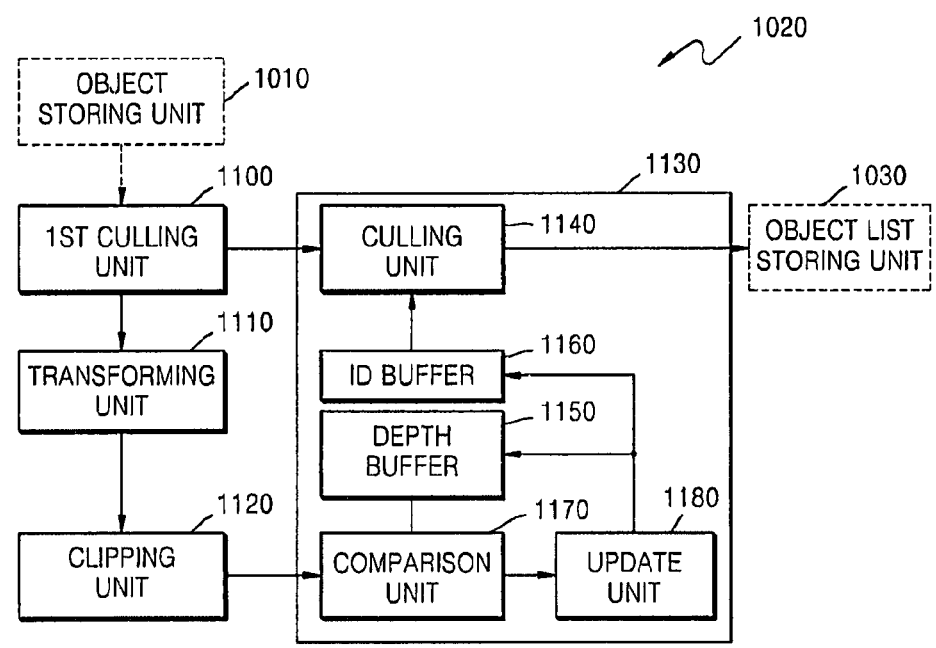
FIG. 11 illustrates an object culling unit, according to an embodiment of the present invention.

A more detailed description of a structure and operation of such an object culling unit 1020 will now be provided with reference to FIG. 11. The object culling unit 1020 may include a first culling unit 1100, a transform unit 1110, a clipping unit 1120, and a second culling unit 1130, for example.

The first culling unit 1100 may generate a view volume with respect to each state of the user interface, and cull objects that are included in the view volume or that intersect with the view volume, from 3D graphic objects stored in the object storing unit 1010. An example of a culling technique that can be used by the first culling unit 110 is a hierarchical viewing frustum culling technique. Referring to FIGS. 3A and 3B, the first culling unit 1100 may generate a view volume with respect to the viewpoint of a given state. Here, the view volume means a 3D visible space that should be seen on the screen from a given viewpoint. The viewpoint may also vary with respect to a projection technique. In the case of parallel projection, a rectangular parallelepiped view volume can be generated and in the case of perspective projection, a quadrangular pyramid view volume can be generated. FIG. 3A illustrates the case where a view volume of a viewing frustum with the latter shape is generated. With respect to each of the 3D graphic objects stored in the object storing unit 1010, the first culling unit 1100 may, thus, determine whether the bounding volume of the upper layer is included in or intersects with the inside of the viewing frustum. If a bounding volume positioned outside the viewing frustum exists in the upper layer, the first culling unit 1100 would not be required to separately determine whether an object is positioned inside the viewing frustum for the objects belonging to the upper layer. In the case of the intermediate layer 320 intersecting with the viewing frustum, it is determined, in relation to the lower layer of the intermediate layer 320, whether each object 330 and 340 is positioned inside the viewing frustum. The first culling unit 1100 may then cull objects that are included in the viewing frustum or that intersect with the viewing frustum, and transfer the objects to the transform unit 1110.

The transform unit 1110 may project each primitive, e.g., forming the objects culled in the first culling unit 1110, onto the screen, and transfer each projected primitive to the clipping unit 1120. In order to project each project onto the screen in the transform unit 1110, a coordinate transform process may be required. This transform process can include transforming all vertices of each primitive to local coordinates, then transforming the local coordinates to world coordinates, and then, transforming the world coordinates to camera coordinates. The local coordinate system is a coordinate system for defining each object, the world coordinate system is a coordinate system for defining each object in an entire scene, and the camera coordinate system is a coordinate system for defining each object when a camera is positioned at the origin.

The projection can be broken down into parallel projection where relative sizes of objects are maintained, and perspective projection where the size of each object is projected differently. The perspective projection has a problem in that the calculation is a little more complicated than that of the parallel projection, but the perspective projection provides a more realistic projection results, because a closer object is projected relatively larger and a distant object is projected smaller.

If the projected primitive does not intersect with the screen, that is, if the entire projected primitive is included in the screen, the clipping unit 1120 may transfer the primitive projected by the transform unit 1110 directly to the second culling unit 1130.

However, if the projected primitive intersects with the screen, the portion extending outside the screen of the primitive is clipped, and then, the remaining primitive is transferred to the second culling unit 1130. FIG. 2 illustrates a process of clipping a portion of a primitive intersecting with the screen in the clipping unit 1120. Since FIG. 2 has been described above, a more detailed description will be omitted here.

The second culling unit 1130 may cull at least one object that is meant to actually be seen on the screen from the viewpoint of a given state, from among the objects culled in the first culling unit 1100, by using the depth information of the primitive transferred from the clipping unit 1120, and the transparency information of the objects culled in the first culling unit 1100. If a plurality of objects overlap at an identical position of the screen, and if the object at the front of the overlapping objects is opaque, the objects behind the opaque object should not be seen. However, if the front object is a transparent object, the object behind the transparent object should also be seen on the screen. Accordingly, based on this principle, and by using the transparency of an object and the depth information of the primitive of the object, the second culling unit 1130 may cull objects that are meant to actually be seen on the screen.

An example detailed structure and operation of such a second culling unit 1130 will now be explained. The second culling unit may include of a depth buffer 1150, an identification (ID) buffer 1160, a comparison unit 1170, an update unit 1180, and a culling unit 1140, for example.

The depth buffer 1150 may be a buffer storing a depth value or Z value for a pixel forming a screen, and may also be referred to as a Z buffer. If a plurality of objects overlap at an identical position of the screen, and if the object at the front of the overlapping objects is opaque, only the object that appears closest to the screen should actually be seen, and the depth buffer 1150 may be used to cull an object that is to be seen on the screen, by using depth information of the pixels for the screen. Accordingly, the initial value of the depth buffer 1150 may be set as a depth value of a farthest position on the screen.

The ID buffer 1160 may store the ID value of an object expressed by pixels forming the screen. The ID value of an object is a unique value given to each object in order to distinguish 3D graphic objects that may be stored in the object storing unit 1010. For example, a unique number may be given to each object. In addition to other aspects of embodiments of the present invention, the concept of the ID value and the ID buffer 1160 storing the ID value of the object has not previously been implemented by conventional technologies, and may be devised for such embodiments of the present invention.

The comparison unit 1170 may receive, e.g., from the clipping unit 1120, a primitive which is transformed and then potentially partly clipped. The comparison unit 1170 may compare the depth value of a pixel included in the transferred primitive with the depth value stored at a location corresponding to the pixel of the depth buffer 1150. The process of finding the depth value of a pixel that appears closer to the screen in the comparison unit 1170 by comparing the depth value of the pixel with the corresponding depth value in the depth buffer 1150 is referred to as a depth test or a Z test. If the depth value of the pixel represents that the pixel is closer to the screen than the corresponding depth value in the depth buffer 1150, it can be said that the depth test is successful.

The comparison unit 1170 may transfer a result of the depth test with respect to each pixel of the primitive, e.g., transferred from the clipping unit 1120, to the update unit 1180. The comparison unit 1170 perform the depth test with respect to all primitives of all the objects culled in the first culling unit 1100, and each time, the result may be transferred to the update unit 1180.

Accordingly, the update unit 1180 may update the depth value and the ID value stored in the example depth buffer 1150 and the ID buffer 1160, respectively, based on the depth test result performed in the comparison unit 1170. The update unit 1180 may update the depth buffer 1150 and the ID buffer 1160 using different techniques according to whether the pixel whose depth value is compared in the comparison unit 1170 is of a transparent object or an opaque object, for example. If the object including the pixel is an opaque object, the update unit 1180 may delete the existing ID value stored in the location corresponding to the pixel of the ID buffer 1160, and store the ID value of the object including the pixel. In addition, the existing depth value stored in the location corresponding to the pixel of the depth buffer 1150 may be deleted, and the depth value of the pixel compared in the comparison unit 1170 stored in its place. This is because the depth value of the pixel represents that the pixel is closer to the screen than the existing depth value stored in the depth value buffer 1150, which means that the pixel is positioned in front on the screen, and if the object including the pixel is opaque, other objects behind the opaque object are hidden by the opaque object in front of them. However, if the object in front is a transparent object, other objects positioned behind the transparent object can be seen on the screen through the transparent object. Accordingly, in the case where the object including the pixel is a transparent object, the depth buffer 1150 is not updated, and the ID value of an object including the pixel is additionally stored in the location corresponding to the pixel in the ID buffer 1160.

Figure 12A:
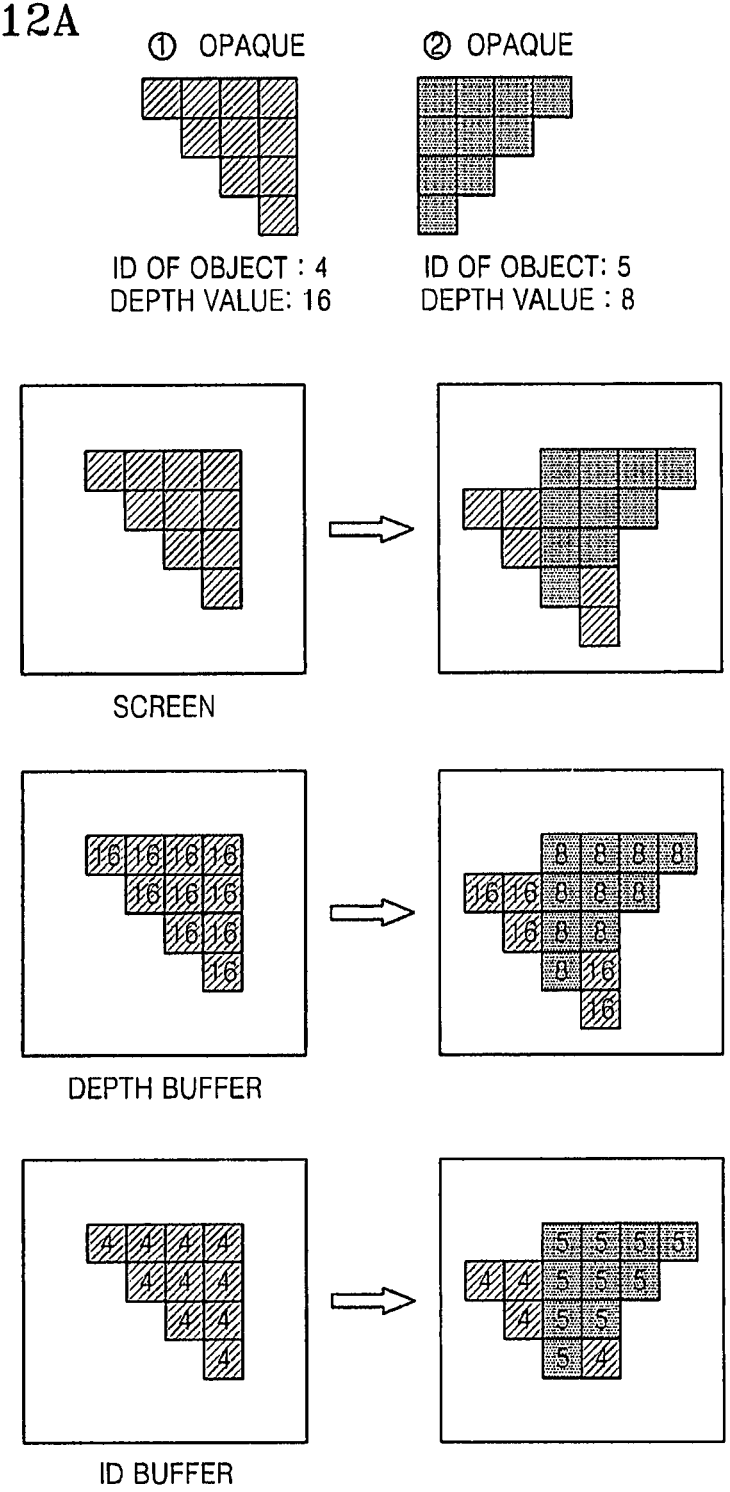

The process described above is illustrated in FIGS. 12A and 12B. FIG. 12A illustrates a principle whereby, when the depth value of an opaque object is already stored in the depth buffer 1150, the depth buffer 1150 and the ID buffer 1160 are updated with a new opaque object. Since an object with an ID value of 4 has a depth value of 16, while an object with an ID value of 5 has a depth value of 8, a portion of the object with the ID value of 4 is hidden by the object with the ID value of 5. Since the depth value of the new object appears closer to the screen than that of the existing depth value stored in the depth buffer 1150, the existing depth value stored in the corresponding location of the depth buffer 1150 is deleted and the depth value of the new object is stored. Likewise, the ID value already stored in the corresponding location of the ID buffer 1160 is deleted and the ID value of the new object is stored.

However, as illustrated in FIG. 12B, if the new object is a transparent object, even though the new object with the ID value of 5 is positioned so as to appear closer to the screen than the existing object with the ID value of 4, both the two objects can be seen at the overlapping portion of the screen because the new object is transparent. That is, in the case of the transparent object, even though the new object is positioned in front of other objects, the new object does not act as an occluder covering other objects. Accordingly, in this case, the depth buffer 1150 is not updated, and the ID value 5 of the new object is additionally stored at the corresponding location of the ID buffer 1160. As a result, both the ID values 4 and 5 are stored at the overlapping part of the ID buffer 1160 in which the object with the ID value 4 and the object with the ID value 5 overlap. Even in this case, if an opaque object is positioned in front of the object with the ID value 5, the corresponding location of the ID buffer 1160 will be updated with the ID value of the opaque object. However, if an object that appears closer to the screen is a transparent object, the ID value of the transparent object will be additionally stored in addition to the ID values of 4 and 5.

Thus, the culling unit 1140 may cull at least one object that is meant to actually be seen on the screen from the viewpoint of a given state, from among the objects transferred from the first culling unit 1100, by using the ID value finally stored in the ID buffer 1160. That is, the ID values finally stored in the ID buffer 1160 may be retrieved and an object having the retrieved ID value culled as an object that is to be actually seen on the screen from the viewpoint of the given state. In addition, the culling unit 1140 may provide the list of culled objects to the object list storing unit 1130. The comparison unit 1170 and the update unit 1180 may further perform a depth test for every pixel of all primitives of all the objects transferred from the first culling unit 110, and update the depth buffer 1150 and the ID buffer 1160 according to the result of the test. Accordingly, the ID value finally stored in the ID buffer 1160 corresponds to the ID value of objects that are to be finally output and seen on the screen after all objects culled in the first culling unit 110 are mapped onto the screen. As a result, in this example embodiment, the culling unit 1140 may cull at least one object that is actually seen on the screen from the given viewpoint, by using the ID value finally stored in the ID buffer 1160.

Figure 13:
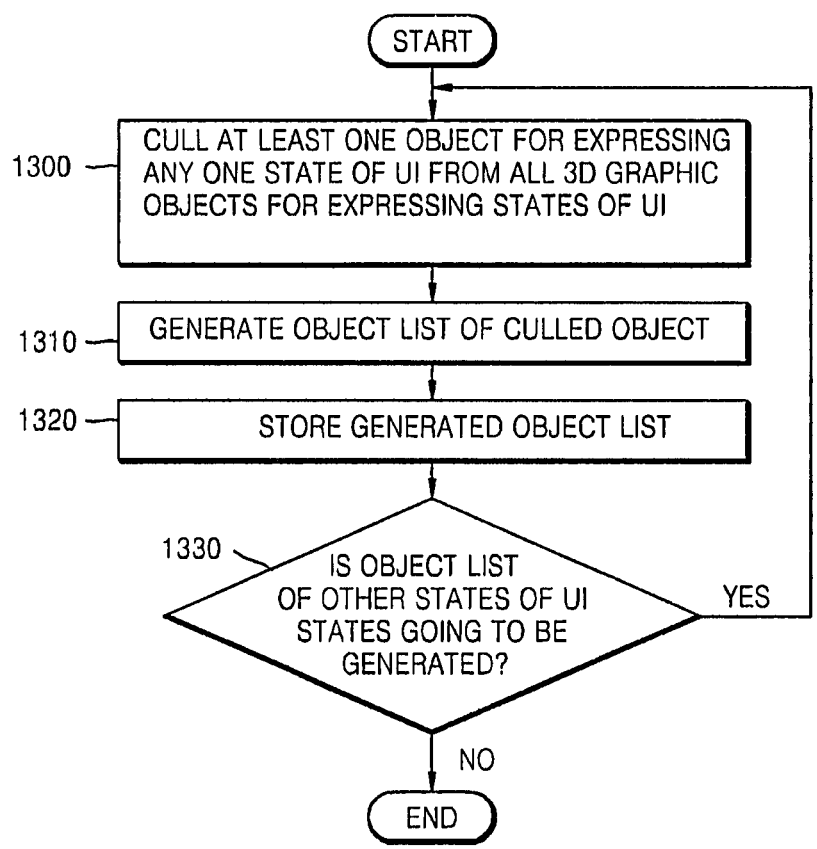
FIG. 13 illustrates a rendering method, according to an embodiment of the present invention.

FIG. 13 illustrates a method of minimizing the number of rendering objects, according to an embodiment of the present invention. Here, the below operations may be performed by a minimizing system, for example, though alternate embodiments are equally available.

In operation 1300, at least one object may be culled for expressing any one state of a user interface, from all 3D graphic objects, for expressing the states of the user interface. Here, the at least one object for expressing any one state of the user interface may be an object that is meant to actually be seen on the screen from the viewpoint of the state.

In operation 1310, an object list with respect to the culled objects may be generated.

In operation 1320, the generated object list may further be stored.

In operation 1320, information on the state of the user interface may also be stored together with the generated object list, for example. In an embodiment, each state of the user interface and the object list corresponding to the state may be paired and stored. In this way, an object list corresponding to a given state can later be retrieved from a plurality of object lists corresponding to respective states of the user interface by using on information on the state of the user interface.

In operation 1330, it may be determined whether to generate the object lists of the other remaining states for which object lists are not generated among the states of the user interface. If it is desired to generate the object lists of the other remaining states, operation 1300 may be performed. However, if it is not desired to generate the object lists of the other remaining states, the generation of an object list of the user interface may be completed.

According to such a method of minimizing the number of rendering objects, for example, only a minimum number of objects for expressing a state are culled with respect to each state of the user interface, and an object list with respect to the culled objects is generated. In this way, when 3D graphic objects for expressing the states of the user interface are later rendered, a visibility test for all objects or rendering of objects that are not actually meant to be seen on the screen does not need to be performed, only a minimum number of objects for expressing a current state of the user interface is extracted, and only the extracted objects need to be rendered.

FIG. 14 is a detailed flowchart of a culling operation, such as the culling operation 1300 of FIG. 13, according to an embodiment of the present invention. In FIG. 14, operations 1400 and 1410 set forth culling objects included in a view volume based on the viewpoint of a given state according to a hierarchical viewing frustum culling technique, and operations 1420 and 1450 set forth culling at least one object that is meant to actually be seen on the screen from the viewpoint of a given state from the culled objects. The below operations may be performed by a minimizing system, for example, though alternate embodiments are equally available.

In operation 1400, a view volume may be generated according to the viewpoint of any one state of the user interface. The view volume may be generated differently depending on which projection technique is used. As noted above, in parallel projection, the view volume may be generated mainly in the form of a cube, and in perspective projection, the view volume may be generated as a quadrangular pyramid.

In operation 1410, at least one object that is included in the inside of the generated view volume, or intersects with the view volume, may be culled from all 3D graphic objects for expressing the states of the user interface. In operation 1410, an object included in the view volume or that intersects with the view volume may, thus, be culled according to a hierarchical viewing frustum culling technique. Since the hierarchical viewing frustum culling technique is described above with reference to the first culling unit 1100 illustrated in FIG. 11, for example, a more detailed description thereof will be omitted here.

In operations 1420 through 1450, at least one object that is to be actually seen on the screen may be culled from the viewpoint of any one state of the user interface from the objects culled in operation 1410. For these operations, and as an example, the explanation of the second culling unit 1130 illustrated in FIG. 11, for example, can be referred to.

In operation 1420, each primitive forming the culled object may be projected onto the screen.

In operation 1430, it may be determined whether each projected primitive intersects with the screen. If the determination result indicates that the primitive intersects with the screen, operation 1440 may be performed. Otherwise, operation 1450 may be performed.

In operation 1440, any portion of each projected primitive extending outside the screen may be cut off. This is a process for removing all pixels positioned outside the screen, and these pixels may thus not be included.

In operation 1450, at least one object that is actually meant to be seen on the screen from any one viewpoint of the user interface may be culled, e.g., by using the depth information of each primitive that does not intersect with the screen and each primitive part of which intersects with the screen and is cut off and by using the transparency information of the culled objects.

Figure 15A:
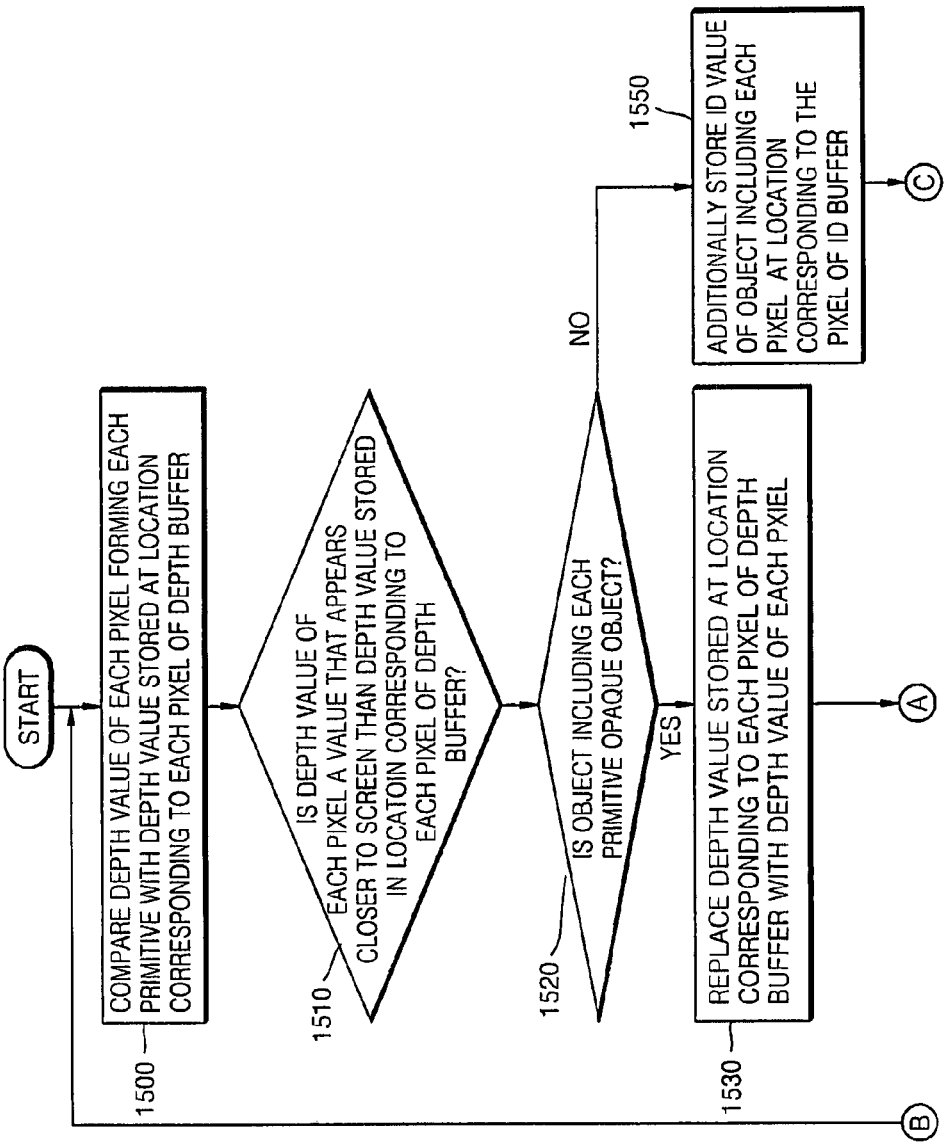
FIGS. 15A and 15B are detailed flowcharts of a culling operation, such as operation 1450 of FIG. 14, in which a minimizing apparatus culls at least one object that is actually seen on the screen from any one viewpoint of the user interface, according to an embodiment of the present invention.
Figure 15B:
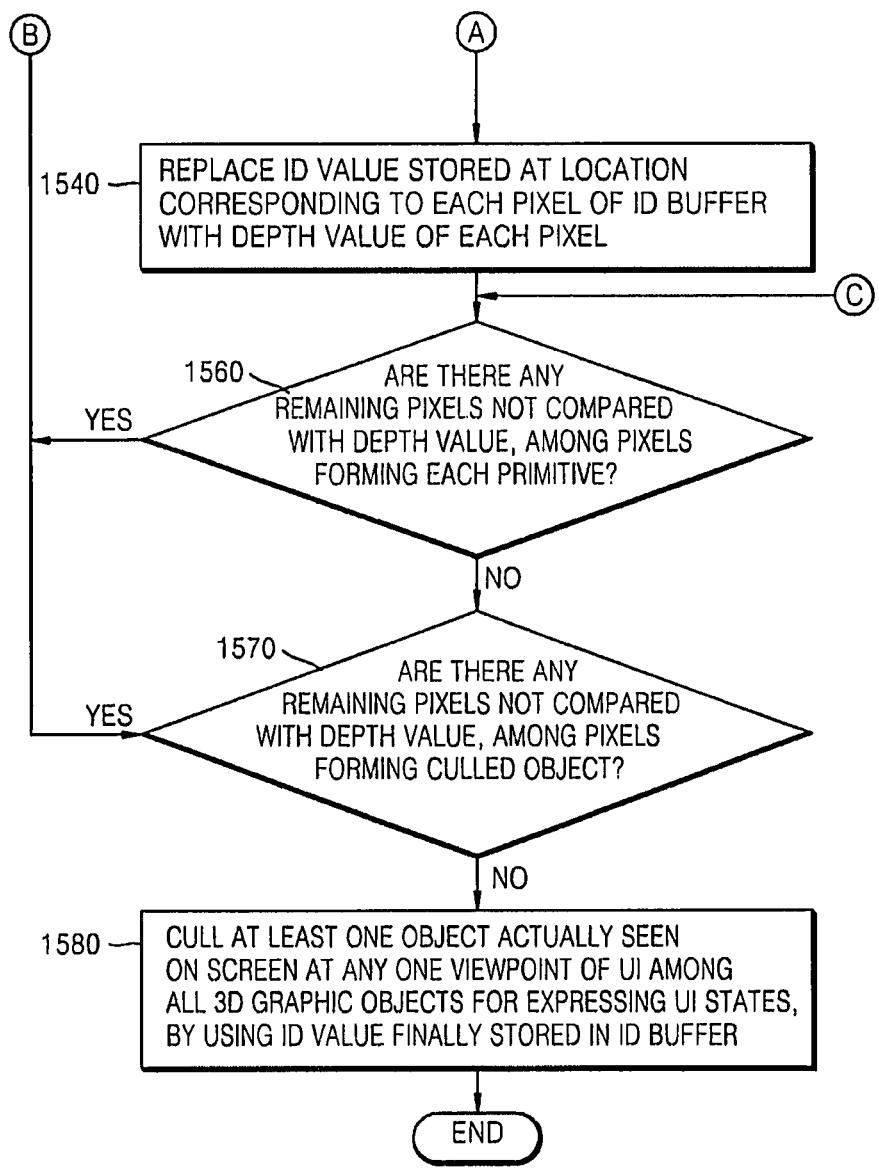

FIGS. 15A and 15B illustrates a culling operation, such as operation 1450 of FIG. 14, according to an embodiment of the present invention. For the operations illustrated in FIGS. 15A and 15B, the above explanation of the comparison unit 1170 and the update unit 1180 illustrated in FIG. 11 can be referred to. The below operations may be performed by a minimizing system, for example, though alternate embodiments are equally available.

First, the aforementioned depth buffer and an ID buffer will now be explained before describing the flowchart of FIG. 15A. The depth buffer stores the depth value of a pixel from among a plurality of pixels that form a screen. When a plurality of objects overlap at an identical position of one screen, and if each object is opaque, only the object that appears closest to the screen should actually be seen. In this case, the depth buffer can be used to cull an object that is to be seen on the screen by using the depth information from the screen. Accordingly, the initial value of the depth buffer may be set as a depth value at the farthest position on the screen.

Referring to FIG. 15A, in operation 1500, the depth value of each pixel forming each primitive may be compared with the depth value stored in the location corresponding to the pixel of the depth buffer. If the depth value of the pixel indicates that the pixel should appear closer to the screen than the corresponding depth value in the depth buffer, it can be said that the depth test is successful.

In operation 1510, it may be determined whether the depth value of each pixel appears closer to the screen than the depth value stored at the location corresponding to the pixel of the depth buffer. That is, it may be determined whether the depth test is successful. If the determination result indicates that the depth test is successful, operation 1520 may be performed. Otherwise, operation 1560 may be performed.

In operation 1520, it may be determined whether an object including each primitive is a transparent object or an opaque object. If the determination result indicates that the object is an opaque object, operation 1530 may be performed. Otherwise, operation 1550 may be performed.

In operation 1530, the depth value stored at the location corresponding to each pixel of the depth buffer may be replaced with the depth value of the pixel.

In operation 1540, the ID value stored at the location corresponding to each pixel may be replaced with the ID value of the object including each primitive.

In operation 1550, the ID value of the object including each pixel at the location corresponding to the pixel of the ID buffer may additionally be stored.

In operations 1530 and 1540 the values stored in the depth buffer and the ID buffer are deleted and the new values are stored because the depth value of the pixel represents that the pixel should appear closer to the screen than the existing depth value stored in the depth value buffer, which means that the pixel is positioned in front on the screen, and if the object including the pixel is opaque, other objects behind the opaque object are hidden by the opaque object. However, if the object in front is a transparent object, other objects positioned behind the transparent object can be seen on the screen through the transparent object. Accordingly, in operation 1550, the values stored in the depth buffer and the ID buffer are not deleted, and the ID value of the object including the pixel is additionally stored at the location corresponding to the pixel in the ID buffer.

In operation 1560, it may be determined whether remaining pixels whose depth values are not compared exist among the pixels forming each primitive. If the determination result indicates that the remaining pixels exist, operations 1500 through 1550 may be performed with respect to the remaining pixels. However, if there is no remaining pixel, operation 1570 may be performed.

In operation 1570, it may be determined whether remaining primitives whose depth values are not compared exist among the primitives forming the culled object. If the determination result indicates that the remaining primitives exist, operations 1500 through 1550 may be performed with respect to the remaining primitives. However, if there are no remaining primitives, operation 1580 (corresponding to operation 1450 in FIG. 14, for example) may be performed.

That is, by performing operations 1560 and 1570, updating of the depth buffer and the ID buffer may be performed with respect to each primitive forming the object culled in operation 1410, for example, by comparing the depth values, and by performing operations 1500 through 1550, the depth buffer and the ID buffer with respect to each pixel forming each primitive may be updated by comparing the depth values.

In operation 1580, at least one object that is to be actually seen from any one viewpoint of the user interface may be culled from all 3D graphic objects for expressing the states of the user interface, by using the ID value finally stored in the ID buffer. That is, the ID value finally stored in the ID buffer may be retrieved, and an object having the retrieved ID value culled as the object that is actually seen from the viewpoint of the given state.

In operations 1560 and 1570, a depth test may be performed with respect to each pixel forming each of the primitives forming the object culled in operation 1410, for example, and according to the test result, updating of the depth buffer and the ID buffer may be performed. Accordingly, the ID values finally stored in the ID buffer correspond to the ID values of objects that are to be finally seen on the screen after all objects culled, e.g., in operation 1410, are mapped onto the screen. Accordingly, objects that are to be finally seen on the screen may be culled by using the ID values finally stored in the ID buffer, e.g., in operation 1580.

According to a method, medium, and system minimizing the number of rendering objects, according to an embodiment of the present invention, as described above, a minimum number of objects for expressing the current state of the user interface are culled from all 3D graphic objects for expressing the states of the user interface, and an object list with respect to the culled objects is generated, thereby enabling the minimum number of objects for expressing the current state of the user system to be extracted and rendered.

FIG. 16 illustrates a method of minimizing the number of rendering objects, according to an embodiment of the present invention. Referring to FIG. 16, in operation 1600, at least one object for expressing any one state of the user interface may be culled from all 3D graphic objects for expressing the states of the user interface. Here, the below operations may be performed by a minimizing system, for example, though alternate embodiments are equally available.

In operation 1610, the culled object may be rendered and output.

In operation 1620, 3D graphic objects may further be modified by referring to the output result.

In operation 1630, at least one object may be culled for expressing any one state of the user interface from the modified 3D graphic objects.

In operation 1640, an object list may be generated with respect to the culled objects.

According to the current embodiment, the user can render the culled objects and confirm the output result. Accordingly, by referring to the output result, the 3D graphic objects can be modified.

For example, when a 3D graphic object to be used as a menu of a mobile phone is generated, the mobile phone may be desired to operate with low power, with correspondingly limited hardware specifications. Therefore, it may be desired to limit the number of rendering objects to be output on one screen. At this time, in the process of authoring rendering objects, a user, for example, may cull objects that are to be seen on the screen according to the state of the mobile phone menu, render the culled objects, output the rendered objects on the actual screen, and then, modify objects by viewing the objects that are actually output on the screen, so that some objects from among the objects output on the screen cannot be seen on the screen. Accordingly, in such an embodiment, the user may modify the position or size of a 3D graphic object by referring to the output result, and cull again at least one object for expressing any one state of the user interface from the objects modified in operation 1630, and generate a list of the culled objects.

FIG. 17 illustrates a method of minimizing the number of rendering objects, according to another embodiment of the present invention. Below, operations 1710 and 1720 will be only be briefly explained as above discussions have already described similar operations. In addition, the below operations may be performed by an authoring system, for example, though alternate embodiments are equally available.

In operation 1700, 3D graphic objects may be generated for expressing the states of a user interface.

In operation 1710, at least one object may be culled for expressing any one state of the user interface from all the generated 3D graphic objects.

In operation 1720, an object list may be generated with respect to the culled objects.

According to a method, medium, and system minimizing the number of rendering objects, according to an embodiment such as that described above, a minimum number of objects for expressing the current state of the user interface may be culled from the 3D graphic objects and the list generated, thereby enabling the minimum number of objects for expressing the current state of the user interface to be easily extracted later by using this object list in the user interface.

In addition, since a method, medium, and system rendering 3D graphics may easily extract and render the minimum number of objects for expressing the current state of the user interface by using such an object list, the rendering performance can be improved, price competitiveness increased, and manufacturing times reduced.

Figure 18A:
FIGS. 18A and 18B are reference diagrams illustrating improved results of a rendering performance of a user interface engine according to an embodiment of the present invention.
Figure 18B:

FIGS. 18A and 18B are reference diagrams illustrating improved results of a rendering performance of a user interface engine, according to an embodiment of the present invention. FIG. 18A illustrates a result of a rendering using a conventional rendering method, while FIG. 18B illustrates a result of a rendering using a rendering method according to an embodiment of the present invention. When the results illustrated in FIGS. 18A and 18B are compared, it can be seen that objects that are meant to actually be seen on the screen and the qualities of the pictures can be see as identical. However, the rendering speed of the picture illustrated in FIG. 18A is only 7.59 frames per second (fps), while that of the picture illustrated in FIG. 18B is 10.51 fps. Accordingly, it can be seen that the rendering speed is improved by such a rendering method embodiment. That is, since the time for rendering one frame is reduced, while still outputting an identical picture quality, it can be seen that the rendering performance is improved.

According to a method, medium, and system rendering 3D graphics, according to an embodiment of the present invention, a minimum number of objects for expressing the current state of the user interface may be extracted from 3D graphic objects, and only the extracted objects rendered. Accordingly, the rendering performance can be improved.

In addition, according to a method, medium, and system minimizing the number of rendering objects, according to an embodiment of the present invention, a minimum number of objects for expressing each state of the user interface may be culled from 3D graphic objects and an object list with respect to the culled objects generated, thereby enabling the minimum number of objects for expressing a current state of the user interface to be easily extracted by using this object list.

Furthermore, according to a method, medium, and system authoring 3D graphic objects, according to an embodiment of the present invention, 3D graphic objects may be generated, a minimum number of objects for expressing each state of a user interface may be culled from the generated graphic objects, and an object list with respect to the culled objects generated, thereby enabling the minimum number of objects for expressing the current state of the user interface to be easily extracted by using this object list when rendering is performed.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of rendering 3-dimensional (3D) graphic objects, comprising:
    extracting, by a processor, at least one object, from a plurality of 3D graphic objects corresponding to a determined current state of a user interface, which is determined to be viewed by a user, with the determined current state being determined from a plurality of viewpoint based states of the user interface; and
    three-dimensionally rendering only the extracted at least one object among the plurality of 3D graphic objects,
    wherein a viewpoint of the viewpoint based states is a respective point or direction from which the three-dimensional rendering of the at least one object is rendered to be seen from, with the respective point or direction being exterior to the three-dimensionally rendered at least one object,
    wherein the extracting of the at least one object comprises selecting an object listing, among plural object listings respectively corresponding to each state of the user interface, based on the determined current state of the user interface such that the at least one object is included in the object listing,
    wherein each of the object listings includes a list of objects that are actually seen from the viewpoint of a respective state and represents a minimum number of objects for expressing the respective state of the user interface respectively.

2. The method of claim 1, wherein the at least one object corresponds to the current state of the user interface is an object that is farther, from a viewpoint of the current state, from another object, of the at least one object, meant to actually be seen on a screen displaying the 3D graphic objects from the viewpoint of the current state.

3. The method of claim 1, further comprising transiting to the current state of the user interface according to an input of a state transition signal for transiting to the current state of the user interface, corresponding to a current viewpoint, from another state of the user interface, corresponding to another viewpoint, and performing the extracting of the at least one object,
    wherein, in the extracting of the at least one object, the extracted at least one object corresponds to the transited to current state of the user interface.

4. The method of claim 3, wherein, in the transiting to the current state of the user interface according to the input of the state transition signal and performing of the extracting of the at least one object, the current state of the user interface is transited to by referring to a state transition table corresponding to each next state to which the other state of the user interface is transited from.

5. The method of claim 1, wherein the extracting of the at least one object comprises:
    retrieving, based on the selected object listing, the object listing corresponding to the current state, among object listings with respect to the plurality of objects respectively corresponding to the plurality of states of the user interface; and
    selectively extracting objects included in the retrieved object list from the 3D graphic objects.

6. The method of claim 1, wherein the object listings are generated and stored prior to the three-dimensional rendering of only the extracted at least one object.

7. The method of claim 1, wherein only the objects listed in the object listing are three-dimensionally rendered.

8. At least one non-transitory medium comprising computer readable code to control at least one processing element to implement the method of claim 1.

9. A system rendering 3D graphic objects, comprising:
    an object extraction unit, comprising at least one processing device, to extract at least one object, from a plurality of 3D graphic objects corresponding to a determined current state of a user interface, which is determined to be viewed by a user, with the determined current state being determined from a plurality of viewpoint based states each of the user interface; and
    a rendering unit to three-dimensionally render only the extracted at least one object among the plurality of 3D graphic objects, wherein a viewpoint of the viewpoint based states is a respective point or direction from which the three-dimensional rendering of the at least one object is rendered to be seen from, with the respective point or direction being exterior to the three-dimensionally rendered at least one object, wherein the extracting of the at least one object comprises selecting an object listing, among plural object listings respectively corresponding to each state of the user interface, based on the determined current state of the user interface such that the at least one object is included in the object listing, wherein each of the object listings includes a list of objects that are actually seen from the viewpoint of a respective state and represents a minimum number of objects for expressing the respective state of the user interface respectively.

10. A method of minimizing a number of rendering objects for rending 3D graphic objects, comprising:

culling at least one object, from a plurality of 3D graphic objects corresponding to a plurality of viewpoint based states of a user interface, which is determined to be viewed by a user corresponding to any determined one state of the user interface, the determined one state being determined from the plurality of states of the user interface; and generating, using at least one processing device, an object list including only the at least one culled object with reference to the one state of the user interface, wherein a viewpoint of the viewpoint based states is a respective point or direction from which a three-dimensional rendering of the at least one of the 3D graphic objects is rendered to be seen from, with the respective point or direction being exterior to the three-dimensionally rendered at least one 3D graphic object, wherein the culling of the at least one object comprises selecting the object list, among plural object lists respectively corresponding to each state of the user interface, based on the determined one state of the user interface such that the at least one object is included in the object list, wherein each of the object lists includes a list of objects that are actually seen from the viewpoint of a respective state and represents a minimum number of objects for expressing the respective state of the user interface respectively.

11. The method of claim 10, wherein the at least one object is an object that is farther, from a viewpoint of the one state, from another object, of the one state of the user interface, meant to actually be seen on a screen displaying the 3D graphic objects from the viewpoint of the one state.

12. The method of claim 11,
wherein the culling of the at least one object comprises:
culling the at least one object based upon the object being included inside a view volume, according to a viewpoint of the one state or intersecting with the view volume, from the plurality of 3D graphics objects.

13. The method of claim 12, wherein the culling of the at least one object further comprises:
projecting each primitive forming culled objects onto the screen; and
culling the objects based on depth information of each projected primitive and any transparency information of corresponding culled objects.

14. The method of claim 13, wherein the projecting of each primitive forming the culled objects onto the screen further comprises clipping a portion of a projected primitive extending outside the screen if the projected primitive intersects with the screen, and in the culling of the at least one object, the at least one object is culled based on depth information of each primitive that does not intersect with the screen, depth information of each primitive whose portion intersects with the screen and is clipped, and transparency information of respective culled objects.

15. The method of claim 14, wherein the culling of the at least one object based on the depth information of each projected primitive that does not intersect the screen and the transparency information of the respective culled objects comprises:

updating an identification (ID) buffer storing an ID value of an object expressed by pixels forming a depth buffer and the screen, for each pixel forming each projected primitive if a depth value of the pixel is a value that indicates that the pixel is closer to the screen than a depth value stored at a location corresponding to the pixel of the depth buffer storing depth values of pixels forming the screen; and culling the at least one object by using an ID value finally stored in the ID buffer.

16. The method of claim 10, wherein the culling of the at least one object further comprises:
modifying 3D graphic objects, of the plurality of 3D objects, by referring to a rendering result of the 3D objects; and
culling the at least one object from the modified 3D graphic objects.

17. The method of claim 10, further comprising generating the plurality of 3D graphic objects before the culling of the at least one object.

18. At least one non-transitory medium comprising computer readable code to control at least one processing element to implement the method of claim 10.

19. A method of minimizing a number of rendering objects for rending 3D graphic objects, comprising:

culling at least one object, from a plurality of 3D graphic objects corresponding to a plurality of viewpoint based states of a user interface, which is determined to be viewed by a user corresponding to any determined one state of the user interface, the determined one state being determined from the plurality of states of the user interface; and generating, using at least one processing device, an object list including only the at least one culled object with reference to the one state of the user interface, wherein a viewpoint of the viewpoint based states is a respective point or direction from which a three-dimensional rendering of the at least one of the 3D graphic objects is rendered to be seen from, with the respective point or direction being exterior to the three-dimensionally rendered at least one 3D graphic object, wherein the culling of the at least one object comprises selecting the object list, among plural object lists respectively corresponding to each state of the user interface, based on the determined one state of the user interface, wherein each of the object lists includes a minimum number of objects for expressing each state of the user interface respectively, wherein the at least one object is an object that is farther, from a viewpoint of the one state, from another object, of the one state of the user interface, meant to actually be seen on a screen displaying the 3D graphic objects from the viewpoint of the one state, wherein the culling of the at least one object comprises:
culling the at least one object based upon the object being included inside a view volume, according to a viewpoint of the one state or intersecting with the view volume, from the plurality of 3D graphics objects,
wherein the culling of the at least one object further comprises:
projecting each primitive forming culled objects onto the screen; and
culling the objects based on depth information of each projected primitive and any transparency information of corresponding culled objects,
wherein the projecting of each primitive forming the culled objects onto the screen further comprises clipping a portion of a projected primitive extending outside the screen if the projected primitive intersects with the screen,
and in the culling of the at least one object, the at least one object is culled based on depth information of each primitive that does not intersect with the screen, depth information of each primitive whose portion intersects with the screen and is clipped, and transparency information of respective culled objects,
wherein the culling of the at least one object based on the depth information of each projected primitive that does not intersect the screen and the transparency information of the respective culled objects comprises:
updating an identification (ID) buffer storing an ID value of an object expressed by pixels forming a depth buffer and the screen, for each pixel forming each projected primitive if a depth value of the pixel is a value that indicates that the pixel is closer to the screen than a depth value stored at a location corresponding to the pixel of the depth buffer storing depth values of pixels forming the screen; and
culling the at least one object by using an ID value finally stored in the ID buffer,
wherein the updating of the ID buffer comprises:
replacing the depth value stored at the location corresponding to the pixel of the depth buffer with the depth value of the pixel if the object including primitives is an opaque object, and replacing the ID value stored at the location corresponding to the pixel of the ID buffer with the ID value of the object including the primitives; and
storing the ID value of the object including the primitives at the location corresponding to the pixel of the ID buffer if the object including the primitives is a transparent object.

20. A method of minimizing a number of rendering objects for rending 3D graphic objects, comprising:
culling at least one object, from a plurality of 3D graphic objects corresponding to a plurality of viewpoint based states of a user interface, which is determined to be viewed by a user corresponding to any determined one state of the user interface, the determined one state being determined from the plurality of states of the user interface;
generating an object list including only the at least one culled object with reference to the one state of the user interface;
extracting the at least one object from the object list, corresponding to a current state of the user interface; and
three-dimensionally rendering, by at least one processing device, only the extracted at least one object among the plurality of 3D graphics objects, wherein a viewpoint of the viewpoint based states is a respective point or direction from which the three-dimensional rendering of the at least one object is rendered to be seen from, with the respective point or direction being exterior to the three-dimensionally rendered at least one object,
wherein the culling of the at least one object comprises selecting the generated object list, among plural object lists respectively corresponding to each state of the user interface, based on the determined one state of the user interface such that the at least one object is included in the object list,
wherein each of the object lists includes a list of objects that are actually seen from the viewpoint of a respective state and represents a minimum number of objects for expressing the respective state of the user interface respectively.

21. At least one non-transitory medium comprising computer readable code to control at least one processing element to implement the method of claim 20.

22. A system, including at least one processing device, minimizing a number of rendering objects, comprising:
an object culling unit to cull at least one object, from a plurality of 3D graphic objects corresponding to a plurality of viewpoint based states of a user interface, which is determined to be viewed by a user corresponding to any determined one state of the user interface, the determined one state being determined from the plurality of states of the user interface; and
an object list generation unit using the at least one processing device to generate an object list including the at least one culled object with reference to the one state of the user interface, wherein a viewpoint of the viewpoint based states is a respective point or direction from which a three-dimensional rendering of at least one of the 3D graphic objects is rendered to be seen from, with the respective point or direction being exterior to the three-dimensionally rendered at least one 3D graphic object,
wherein the culling of the at least one object comprises selecting the generated object list, among plural object lists respectively corresponding to each state of the user interface, based on the determined one state of the user interface such that the at least one object is included in the object list,
wherein each of the object lists includes a list of objects that are actually seen from the viewpoint of a respective state and represents a minimum number of objects for expressing the respective state of the user interface respectively.

23. The system of claim 22, further comprising an object generation unit to generate the plurality of 3D graphic objects.

* * * * *

UNITED STATES PATENT AND TRADEMARK OFFICE
CERTIFICATE OF CORRECTION

| | | |
|---|---|---|
| PATENT NO. | : 8,817,023 B2 | Page 1 of 1 |
| APPLICATION NO. | : 11/889187 | |
| DATED | : August 26, 2014 | |
| INVENTOR(S) | : Sang-oak Woo | |

It is certified that error appears in the above-identified patent and that said Letters Patent is hereby corrected as shown below:

In the Claims

Column 21, Line 56, In Claim 12, delete "volume," and insert -- volume --, therefor.

Signed and Sealed this
Eighteenth Day of August, 2015

Michelle K. Lee
*Director of the United States Patent and Trademark Office*